(12) United States Patent
Bartels

(10) Patent No.: US 8,528,917 B2
(45) Date of Patent: Sep. 10, 2013

(54) WHEEL SUPPORT ASSEMBLY FOR A VEHICLE

(75) Inventor: Alan William Bartels, Wilton, IA (US)

(73) Assignee: The Raymond Corporation, Green, NY (US)

( * ) Notice: Subject to any disclaimer, the term of this patent is extended or adjusted under 35 U.S.C. 154(b) by 175 days.

(21) Appl. No.: 13/020,465

(22) Filed: Feb. 3, 2011

(65) Prior Publication Data

US 2012/0200054 A1 Aug. 9, 2012

(51) Int. Cl.
*B62D 33/00* (2006.01)

(52) U.S. Cl.
USPC ............. 280/43.12; 301/125; 301/5.306

(58) Field of Classification Search
USPC .......... 180/337; 280/43.12, 105; 152/153; 301/5.306, 1, 125
See application file for complete search history.

(56) References Cited

U.S. PATENT DOCUMENTS

| | | | | |
|---|---|---|---|---|
| 2,550,548 A * | 4/1951 | Framhein | ............... | 254/10 C |
| 2,751,255 A * | 6/1956 | Schroeder | ............... | 301/1 |
| 2,913,291 A * | 11/1959 | Delaplace | ............... | 384/277 |
| 3,202,233 A * | 8/1965 | Goodacre et al. | ............... | 180/13 |
| 3,815,959 A | 6/1974 | Hill | | |
| 3,888,187 A * | 6/1975 | Van Moss, Jr. | ............... | 105/224.1 |
| 4,047,820 A * | 9/1977 | Soodak et al. | ............... | 356/244 |
| 4,300,867 A | 11/1981 | Frees | | |
| 4,306,259 A * | 12/1981 | Saito et al. | ............... | 360/99.01 |
| 4,763,957 A * | 8/1988 | Poehlmann et al. | ............... | 301/110.5 |
| 4,856,794 A * | 8/1989 | Boyers et al. | ............... | 277/571 |
| 5,354,080 A * | 10/1994 | Jones | ............... | 280/43.12 |
| 5,380,102 A * | 1/1995 | Sink | ............... | 384/484 |
| 5,538,330 A * | 7/1996 | Ehrlich | ............... | 301/124.1 |
| 5,800,022 A * | 9/1998 | Del Rosario | ............... | 301/5.306 |
| 5,951,027 A * | 9/1999 | Oyen et al. | ............... | 280/11.225 |
| 6,116,701 A * | 9/2000 | Kuo | ............... | 301/111.05 |
| 6,164,729 A | 12/2000 | Dibenedetto et al. | | |
| 6,205,633 B1 * | 3/2001 | Niespodziany et al. | ............... | 29/401.1 |
| 6,322,156 B1 * | 11/2001 | Kuo | ............... | 301/111.01 |
| 6,373,394 B1 * | 4/2002 | Zhang | ............... | 340/584 |
| 6,532,637 B1 * | 3/2003 | Niespodziany et al. | ............... | 29/401.1 |
| 6,561,559 B1 | 5/2003 | Skiller et al. | | |
| 6,820,336 B2 * | 11/2004 | Laitinen et al. | ............... | 29/895.32 |
| 7,845,657 B2 * | 12/2010 | Waltz et al. | ............... | 280/81.1 |
| 8,151,924 B2 * | 4/2012 | Radtke | ............... | 180/206.1 |
| 8,272,469 B2 * | 9/2012 | Stoehr et al. | ............... | 180/337 |
| 2003/0006655 A1 * | 1/2003 | Zhang | ............... | 310/52 |
| 2008/0067861 A1 * | 3/2008 | Eaton | ............... | 301/125 |
| 2009/0103684 A1 * | 4/2009 | Vetter | ............... | 378/144 |

(Continued)

FOREIGN PATENT DOCUMENTS

FR 2817393 A1 * 5/2002

*Primary Examiner* — Nicole Verley
(74) *Attorney, Agent, or Firm* — Quarles & Brady LLP

(57) ABSTRACT

A wheel support assembly for use with a vehicle is disclosed that comprises a vehicle mount coupleable to the vehicle, a recess formed in the vehicle mount, a bearing seated at least partially within the recess, an axle engaged with the bearing and extending away from the bearing, and a wheel supported by the axle. To inhibit the transfer of heat from the bearing to the wheel the bearing is in thermal communication with the vehicle mount and the wheel is spaced apart from the bearing along a longitudinal axis of the axle. The vehicle mount is configured as a heat sink such that a larger portion of the heat generated by the bearing is transferred to the heat sink as compared to the portion transferred to the axle.

20 Claims, 6 Drawing Sheets

(56) References Cited

U.S. PATENT DOCUMENTS

2011/0304123 A1* 12/2011 Jacinto ............................ 280/507
2012/0168557 A1* 7/2012 Edelson et al. ................. 244/50
2012/0169154 A1* 7/2012 Curodeau ....................... 310/43
2012/0197505 A1* 8/2012 Friesen et al. .................. 701/70

* cited by examiner

WHEEL SUPPORT ASSEMBLY FOR A VEHICLE

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The present invention relates to a wheel support assembly for a vehicle, and more particularly to a wheel support assembly including a support arm having a bearing seated in thermal communication within the support arm that rotatably supports a wheel of the vehicle, such that the support arm absorbs a portion of the heat generated by the bearing during rotation of the wheel and inhibits the heat from transferring to the wheel.

Vehicles, such as material handling vehicles (e.g., pallet trucks, reach trucks, counterbalance trucks, tow tractors, order pickers, etc.), utility carts, wagons, etc. incorporate wheels in a variety of roles, such as a drive wheel, a steering wheel, a support wheel, or some combination thereof. In some configurations, the wheel includes a metallic hub and a resilient tire (e.g., polyurethane) that is molded about the hub. One or more bearings are generally press-fit into the hub. An axle then extends through the bearing(s) and is rotatably fixed at one or more ends to a support arm. As a result, the bearing(s) within the hub allows the wheel to rotate about the fixed axle.

By nesting the bearing within the hub, a large portion of the heat generated by the bearing during rotation of the wheel is transferred into the hub. As the temperature of the hub increases, the tire about the hub is also subjected to increased temperatures. Oftentimes this heat negatively influences the bond between the hub and the tire, thereby ultimately reducing the operational life of the wheel.

Increased market demands for efficiency have compounded the issues. For instance, in the material handling industry increased load carried by the wheels, smaller wheel diameters, and higher rotational velocities of the wheels tend to exacerbate the heat generated during operation of the bearing, further impacting the useful life of a wheel. Moreover, integral bearing-wheel configurations (e.g., a bearing that is press-fit in the hub of a wheel) are often replaced as a single unit when either the bearing or wheel fails, even though the other component may still have a substantial amount of remaining useful life.

Therefore, a need exists for an improved wheel support assembly for a vehicle that better manages thermodynamic considerations of modern vehicles.

SUMMARY

The present disclosure generally provides a wheel support assembly including a vehicle mount having at least one bearing seated in thermal communication within the vehicle mount that rotatably supports at least one wheel of the vehicle, thereby absorbing at least a portion of the heat generated by the bearing during rotation of the wheel and inhibiting the heat from transferring to the wheel.

In one aspect, a wheel support assembly for use with a vehicle comprises a vehicle mount coupleable to the vehicle, a recess formed in the vehicle mount, a bearing seated at least partially within the recess and in thermal communication with the vehicle mount, an axle engaged with the bearing and extending away from the bearing, and a wheel supported by the axle and spaced apart from the bearing along a longitudinal axis of the axle. The vehicle mount is configured as a heat sink such that a larger portion of the heat generated by the bearing is transferred to the heat sink than the axle.

In another aspect, a wheel support assembly for use with a vehicle comprises a support arm extending from the vehicle defining a first leg and a second leg, a first recess formed in the first leg, a second recess formed in the second leg, a first bearing seated at least partially within the first recess and in thermal communication with the first leg, a second bearing seated at least partially within the second recess and in thermal communication with the second leg, an axle engaged with the first bearing and the second bearing, and a wheel supported by the axle between the first bearing and the second bearing. At least one of the first and second legs is configured as a heat sink such that a larger portion of the heat generated by the first or second bearing is transferred to the heat sink than the axle.

In a further aspect, a wheel support assembly for use with a vehicle comprises a support arm extending from the vehicle, a recess formed in the support arm, a first bearing seated at least partially within the recess and in thermal communication with the support arm, a second bearing seated at least partially within the recess and in thermal communication with the support arm, an axle engaged with the first bearing and the second bearing, and extending away from the first bearing and the second bearing, and at least one wheel supported by the axle and spaced apart from the first bearing and the second bearing along a longitudinal axis of the axle. The support arm is configured as a heat sink such that a larger portion of the heat generated by the first bearing and the second bearing is transferred to the heat sink than the axle.

These and still other aspects will be apparent from the description that follows. In the detailed description, preferred example embodiments will be described with reference to the accompanying drawings. These embodiments do not represent the full scope of the invention; rather the invention may be employed in other embodiments. Reference should therefore be made to the claims herein for interpreting the breadth of the invention.

DETAILED DESCRIPTION OF THE PREFERRED EXAMPLE EMBODIMENT

Several example embodiments of wheel support assemblies will be described. As one skilled in the art will appreciate, however, the wheel support assembly concept may be implemented in a variety of different configurations and arrangements. Moreover, while the example wheel support assembly is generally described with reference to a fork truck, the wheel support assembly concept is equally applicable to other types and styles of powered and unpowered vehicles, such as pallet trucks, tow tractors, sideloaders, counterbalanced trucks, reach trucks, wagons, utility trailers, and the like.

Figure 1:
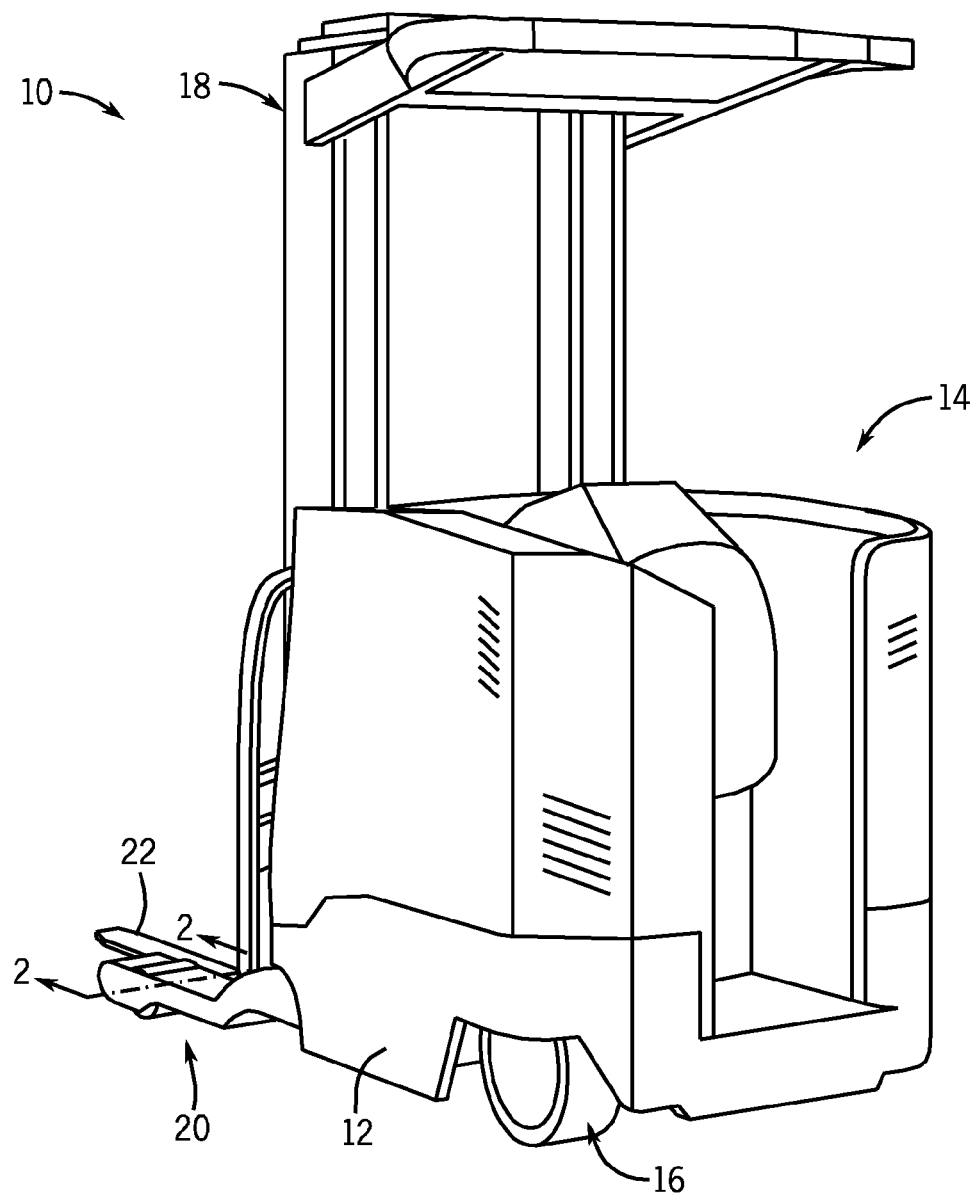
FIG. 1 is an isometric view of an example vehicle.

A vehicle in the form of a fork truck (10) is illustrated in FIG. 1. The fork truck (10) typically includes a frame (12) supporting an operator compartment (14), a steering/drive assembly (16), a drive unit (not shown) such as an electric motor, and a mast assembly (18), and a pair of base legs (20). A pair of load forks (22) are coupled to the mast assembly (18) and are configured for vertical movement (relative to a support surface, such as a floor) between a lowered position (shown in FIG. 1) and a raised position (not shown) as the mast assembly (18) telescopically extends and retracts. One skilled in the art will appreciate the operation and interconnection of the various components of the example fork truck (10).

In the example fork truck (10), each base leg (20) includes a pair of load wheels (30) rotatably mounted to the base leg (20). During operation of the fork truck (10), the load wheels (30) rotate, thus generating heat.

Figure 2:
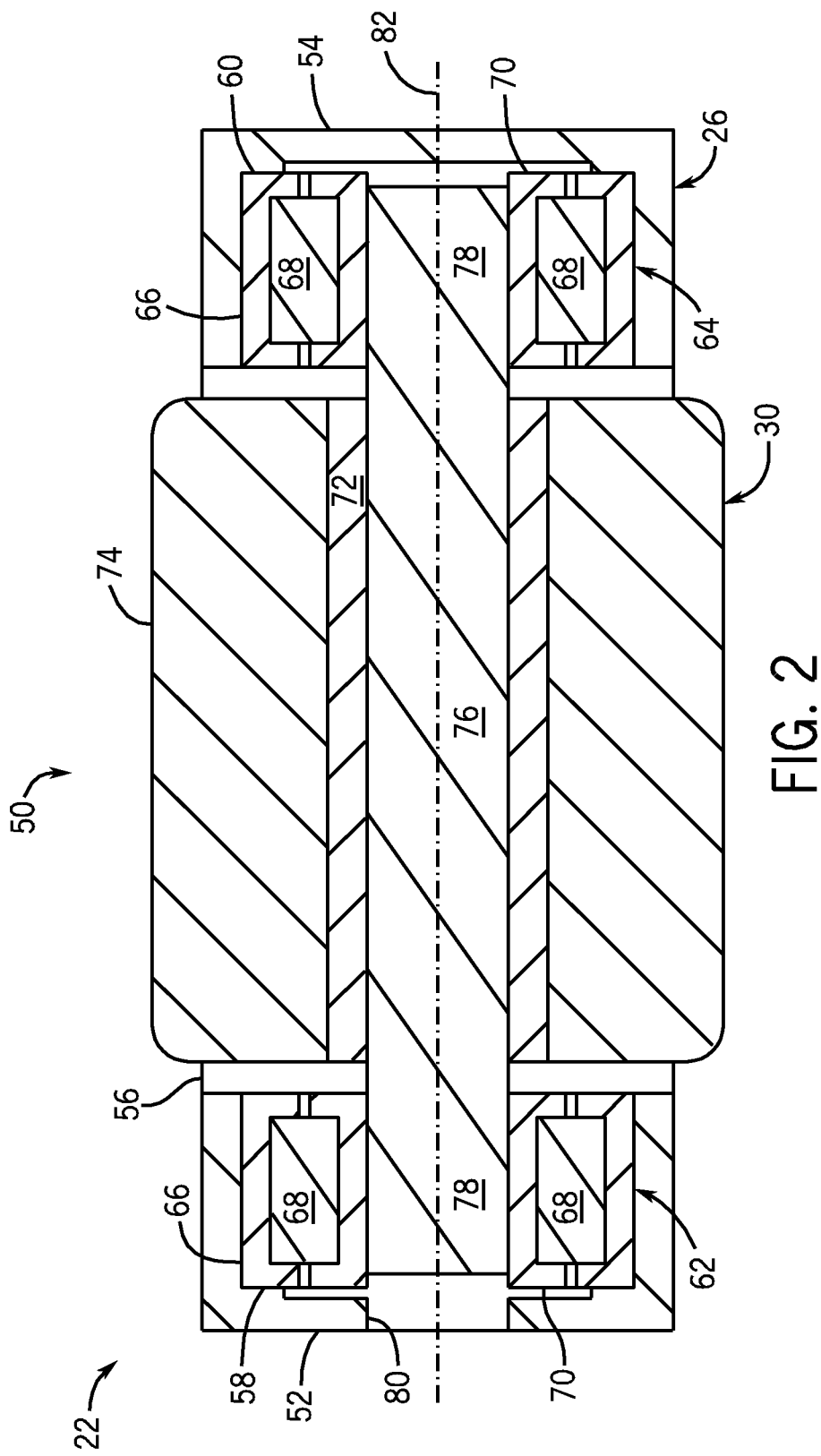
FIG. 2 is a simplified cross-section along line 2-2 shown in FIG. 1 of an example wheel support assembly incorporating a single wheel.

Turning to FIG. 2, a cross-section along line 2-2 of FIG. 1 illustrates a first example wheel support assembly (50). A vehicle mount (26) that is integral with the frame (12) of the fork truck (10) (more specifically, the base leg (20)) includes a first leg (52) and a second leg (54) connected by a bridge (56). A first recess (58) is formed in the first leg (52) and a similar second recess (60) is formed in the second leg (54). A first bearing (62) is seated within the first recess (58) and a second bearing (64) is similarly seated in the second recess (60). In this embodiment, the first bearing (62) and the second bearing (64) are press-fit (or thermally shrink/expand fit) into the respective first recess (58) and second recess (60) such that outer races (66) of the bearings (62, 64) are inhibited from rotating relative to the vehicle mount (26). The bearings (62, 64) are shown completely seated within the vehicle mount (26) to maximize the thermal communication between the bearings (62, 64) and the vehicle mount (26); however, the bearings (62, 64) need not be completely seated within the vehicle mount (26). Other constructions may be used to secure the bearings (62, 64), such as adhesive or spring clips. In addition, while not shown, a groove may be formed, for example, adjacent the first recess (58) and a snap ring may be seated in the groove to capture the bearing in the first recess (58).

The example bearings (62, 64) are illustrated as roller bearings having multiple rollers (68) sandwiched between the outer race (66) and an inner race (70), as is well understood by one of ordinary skill in the art. Any bearing type or construction is contemplated, such as ball bearings, angular contact bearings, double row ball bearings, tapered roller bearings, and the like. Sealed bearings are preferred in certain applications to restrict environmental and other contaminants from fouling or undesirably influencing the operation of the bearings (62, 64).

The wheel (30) includes a hub (72) about which a tire (74) is secured. In one form, the hub (72) is metallic (e.g., steel) and the tire (74), which may be non-metallic (e.g., plastic, such as, polyurethane), is molded over or secured to the hub (72). An axle (76) extends laterally outward (as viewed in FIG. 2) from the wheel (30) to engage the respective first bearing (62) and second bearing (64). Specifically, the ends (78) of the axle (76) are fit into and rotationally coupled to the inner race (70) of the respective bearings (62, 64) such that the axle (76) rotates substantially in unison with the inner races (70). The hub (72) in this example embodiment is fixed to the axle (76) (e.g., the hub (72) may be press-fit over the axle (76) to axially and rotationally fix the hub (72) and the axle (76) or a roll pin (not shown) may extend through the tire (74) and partially through the hub (72) into a hole formed in the axle (76)). With the bearings (62, 64) fit within the respective recess (58, 60) and the wheel (30) positioned between the first leg (52) and second leg (54), the axle (76) may be inserted through a bore (80) formed through the first recess (58) in the first leg (52). Snap rings, clips, or any other restraint may be used to capture the axle (76), as will be appreciated by one skilled in the art given the benefit of this disclosure.

While the axle (76) defines a circular cross-section in a plane perpendicular to the longitudinal axis (82) of the axle (76), many other form factors are available, such as square, hexagonal, triangular, and the like. Furthermore, any number and/or type of wheels (30) may be supported by the axle (76); for instance, a pair of solid rubber wheels may be supported by the axle (76), one or more plastic wheels may be incorporated, or multiple pneumatic wheels may be supported on an axle engaged with bearings seated in three or more vehicle support arms and/or legs.

The wheel support assembly (50), shown in FIG. 2, spaces the wheel (30) apart from the bearings (62, 64) along a longitudinal axis (82). By removing the bearings (62, 64) from within the hub (72) and seating the bearings (62, 64) in thermal communication with the vehicle mount (26), heat generated as the bearings (62, 64) rotate is not directly transferred into the hub (72). In some instances, this configuration allows for the wheels (30) to be reduced in size and larger bearings (62, 64) to be incorporated thereby accommodating increased loads.

At least a portion of the heat generated by the bearings (62, 64) during rotation of the wheel (30) is inhibited from transferring to the wheel (30). A larger portion of the heat is transferred to and absorbed by the legs (52, 54), which are configured as heat sinks, as compared to that portion of heat transferred to the axle (76). In preferred forms, the vehicle mount (26) is cast from a ductile metal such that the vehicle mount (26) establishes a heat sink absorbing heat generated by the rotating bearings (62, 64). The thermal resistance between the bearings (62, 64) and the vehicle mount (26) is less than the thermal resistance between the bearings (62,64) and the axle (76), further inhibiting heat transfer toward the wheel (30) and promoting heat transfer toward the vehicle mount (26) in its capacity as a heat sink. In addition, by providing a vehicle mount (26) having a higher thermal conductivity as compared to the axle (76) a larger portion of the heat generated by the bearings (62, 64) is transferred to the vehicle mount (26) than the axle (76) (and thus wheel (30)). In general, the vehicle mount (26) has a higher thermal diffusivity (i.e., the ratio of the thermal conductivity to the heat capacity) than the axle (76), such that the vehicle mount (26) responds more quickly to thermal changes, such as heat being generated by rotating bearings (62, 64). In preferred configurations, friction between the tire (74) and the ground dominates the thermodynamic response of the wheel (30). Furthermore, as one skilled in the art will appreciate, larger and smoother contact surfaces between the bearings (62, 64) and the vehicle mount (26), in addition to, for instance, thermal grease/paste, will enhance the heat transfer from the bearings (62, 64) to the vehicle mount (26).

By spacing the bearings (62, 64) from within the wheels (30), the inner diameter receiving the axle (76) may be as small as one inch or less, and the outer diameter of the wheel (30) may be as small as three inches or less, yet still provide sufficient material for various application requirements (e.g., four thousand pound capacity pallet trucks). Relatively small diameter wheels (30) allow the base legs (20) to have a correspondingly reduced profile. Furthermore, separating the wheels (30) and bearings (62, 64) allows for each to be replaced independently of the others, providing maintenance and operational benefits, such as lower costs and less downtime.

Figure 3:
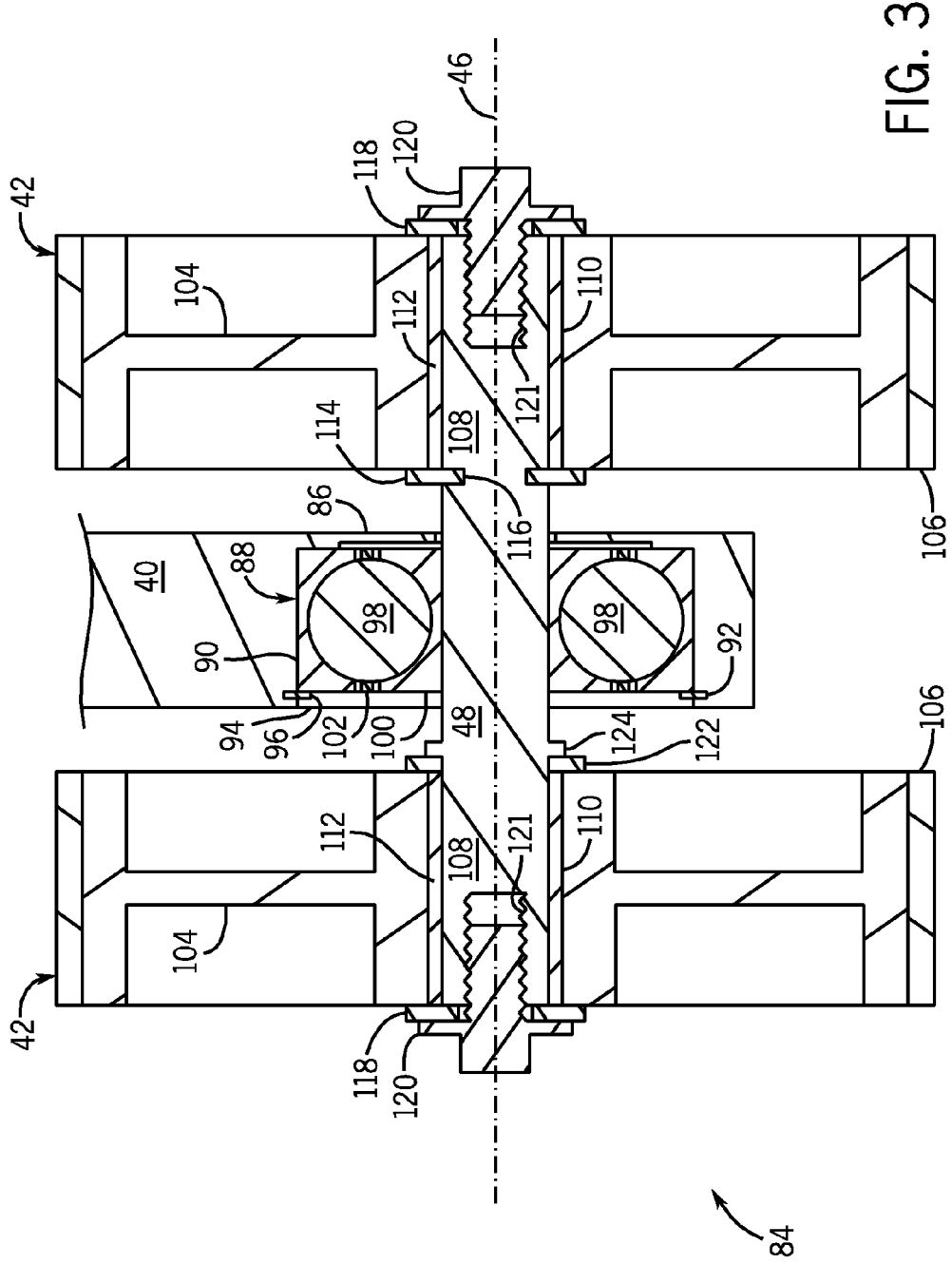
FIG. 3 is a simplified cross-section of another example wheel support assembly incorporating a pair of wheels.

Turning to FIG. 3, a second example wheel support assembly (84) is illustrated. In this example, the vehicle mount is in the form of a support arm (40) that extends from a vehicle (e.g., the example fork truck (10)). A recess (86) is formed in the support arm (40) and a bearing (88) is seated within the recess (86). The bearing (88) is fit into the recess (86) such that an outer race (90) of the bearing (88) is inhibited from rotating relative to the support arm (40). A groove (92) is formed in the support arm (40) adjacent an opening (94) of the recess (86), and a snap ring (96) is seated in the groove (92) to capture the bearing (88) in the recess (86). The bearing (88) is shown completely seated within the support arm (40) to maximize the thermal communication between the bearing (88) and the support arm (40). In the embodiment illustrated in FIG. 3, the bearing (88) is a typical ball bearing having multiple balls (98) sandwiched between the outer race (90) and an inner race (100) and engaged by a cage (102), as is well known to one of ordinary skill in the art.

A pair of wheels (42) are coupled to the support arm (40), and each wheel (42) includes a hub (104) about which a tire (106) is secured. The axle (48) is rotationally fixed to the inner race (100) (e.g., press-fit) such that the axle (48) and the inner race (100) rotate substantially in unison. The axle (48) extends laterally outward (as viewed in FIG. 3) from the bearing (88) to engage the wheels (42). The ends (108) of the axle (48) extend into openings (110) formed through the hubs (104). A bushing (112) is fitted between the axle (48) and each of the openings (110) in the wheels (42). The inclusion of the bushings (112) allows the wheels (42) to rotate at different rates when the vehicle is turning. Preferably, when the wheels (42) are "straight" (i.e., there is no difference in rotational velocity between the wheels (42)) the friction between the axle (48) and the wheels (42) is greater than the internal friction of the bearing (88), such that there is no relative rotation between the wheels (42) and the axle (48). When the wheels (42) are "turned," each wheel (42) is traveling along a separate arc, with the inner arc being less than the outer arc, as such, the outer wheel (42) travels further and must rotate faster than the inner wheel (42). The bearing (88) continues to rotate, but the bushings (112) allow the wheels (42) to rotate at different rates. In other forms, the bushing (112) may be any other type of friction reducing element, such as a bearing, or preferably a material impregnated with a lubricant (e.g., Polylube bushings manufactured by Polygon Company located in Walkerton, Ind.).

With the axle (48) fixed to the bearing (88), each wheel (42) is engaged with the ends (108) of the axle. In one form, the right wheel (42) (as viewed in FIG. 3) axially abuts a snap ring (114) seated in a groove (116) formed in the axle (48). A washer (118) is then urged against the wheel (42) by a fastener (120) threadably engaged with a mating threaded bore (121) formed in the end (108) of the axle (48), thereby rotationally coupling the wheel (42) and the axle (48) until relative rotation between the wheels (42) results in rotation of the wheel (42) about the bushing (112). The left wheel (42) axially abuts a washer (122) adjacent an annular lip (124) formed on the axle (48). Then, as with the right wheel (42), a washer (118) is urged against the wheel (42) by a fastener (120) engaged with another mating threaded bore (121) formed in the other end (108) of the axle (48).

The wheel support assembly (84), shown in FIG. 3, also spaces the wheels (42) apart from the bearing (88) along a longitudinal axis (46) of the axle (48). By removing the bearing (88) from within the hubs (104) and seating the bearing (88) in thermal communication with the support arm (40), heat generated as the bearing (88) rotates is not directly transferred into the hubs (104). Instead, a larger portion of the heat generated by the rotating bearing (88) is transferred to and absorbed by the support arm (40) (configured as a heat sink), as compared to the axle (48). This configuration helps inhibit undesirable heat from transferring through the axle (48) and into the wheels (42). Again, the support arm (40) preferably defines a higher thermal diffusivity as compared to the axle (48).

Figure 4:
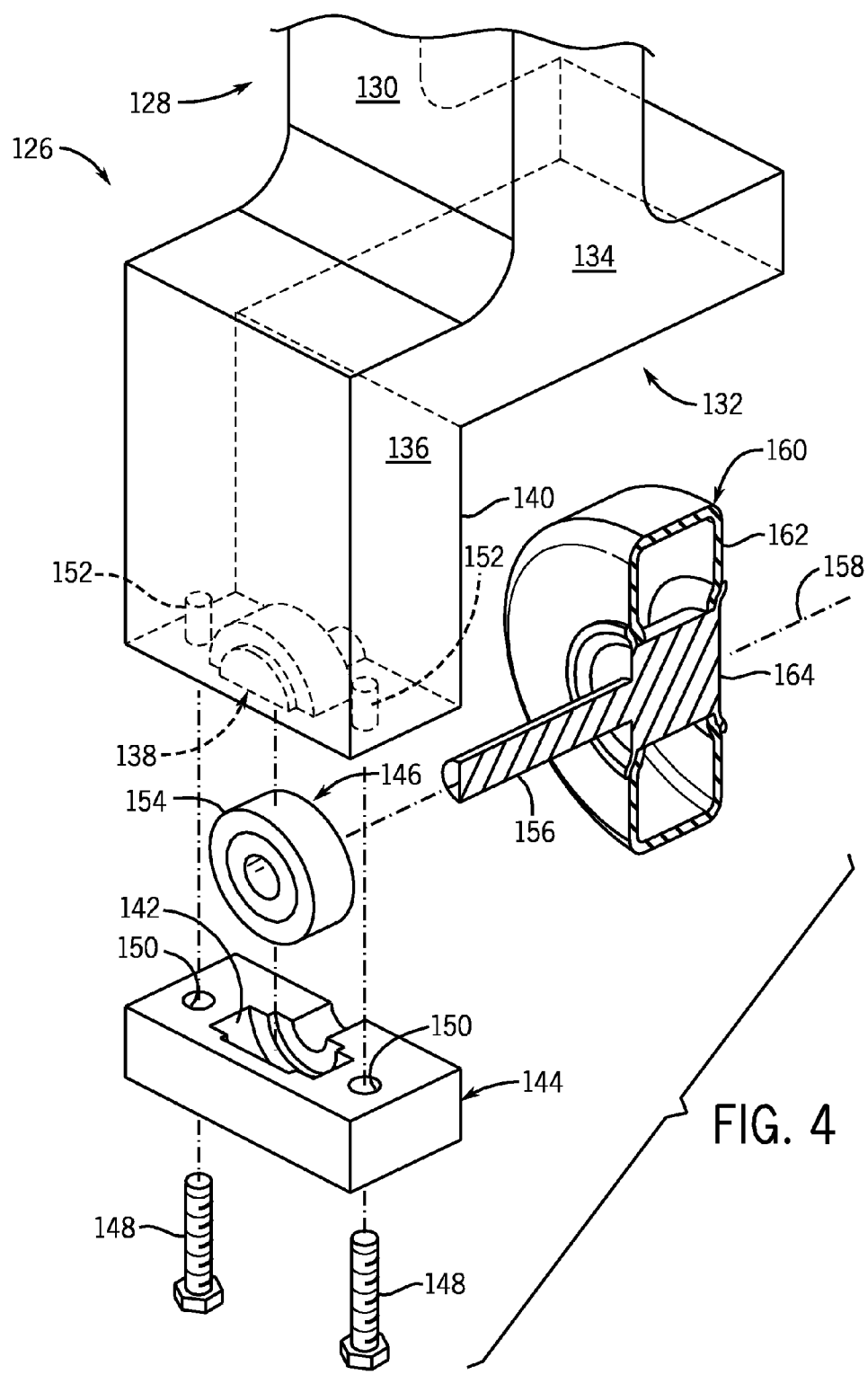
FIG. 4 is a partial exploded view of another example wheel support assembly.

Turning now to FIG. 4, a third example wheel support assembly (126) is illustrated. The vehicle mount is again illustrated in the form of a support arm (128) that includes a post (130) extending from a vehicle (not shown). The post (130) extends downward (as shown in FIG. 4) forming an L-shaped support (132) with a horizontal leg (134) and a vertical leg (136). An upper recess (138) is formed in the distal end (140) of the vertical leg (136) of the support arm (128), and a lower recess (142) is formed in a removable cap portion (144) of the support arm (128) near the distal end (140). A bearing (146) is fastened to the support arm (128) as it is captured within the upper recess (138) and lower recess (142) when the removable cap portion (144) is fastened to the distal end (140) of the support arm (128). In the example illustrated, a pair of bolts (148) extend into openings (150) formed through the removable cap portion (144) and into threaded bores (152) formed in the vertical leg (136). The bearing (146) is captured such that an outer race (154) is inhibited from rotating relative to the support arm (128).

An axle (156) is engaged with the bearing (146) (e.g., press-fit, shrink-fit, expand-fit, or the like) and extends away from the bearing (146) along a longitudinal axis (158). A wheel (160) is supported by the axle (156) at a location that is spaced apart from the bearing (146) along the longitudinal axis (158) of the axle (156). As illustrated in FIG. 4, the wheel (160) includes a pneumatic tire (162) mounted on a hub (164). The hub (164) is formed integral with the axle (156) such that the wheel (160) supported thereon maintains an axial separation from the bearing (146). Also, as with all of the examples, the wheel may be any type of wheel, such as a load wheel, a drive wheel, a caster wheel, and a steering wheel.

The wheel support assembly (126), illustrated in FIG. 4, again spaces the wheel (160) apart from the bearing (146) along a longitudinal axis (158) of the axle (156). And, again, by removing the bearing (146) from within the hub (164) and seating the bearing (146) in thermal communication with the support arm (128) configured as a heat sink with a relatively higher thermal diffusivity, heat generated as the bearing (146) rotates is not directly transferred into the hub (164). Instead, a larger portion of the heat is transferred to and absorbed by the support arm (128) than the axle (156), and thus is generally transferred away from the wheel (160).

Figure 5:
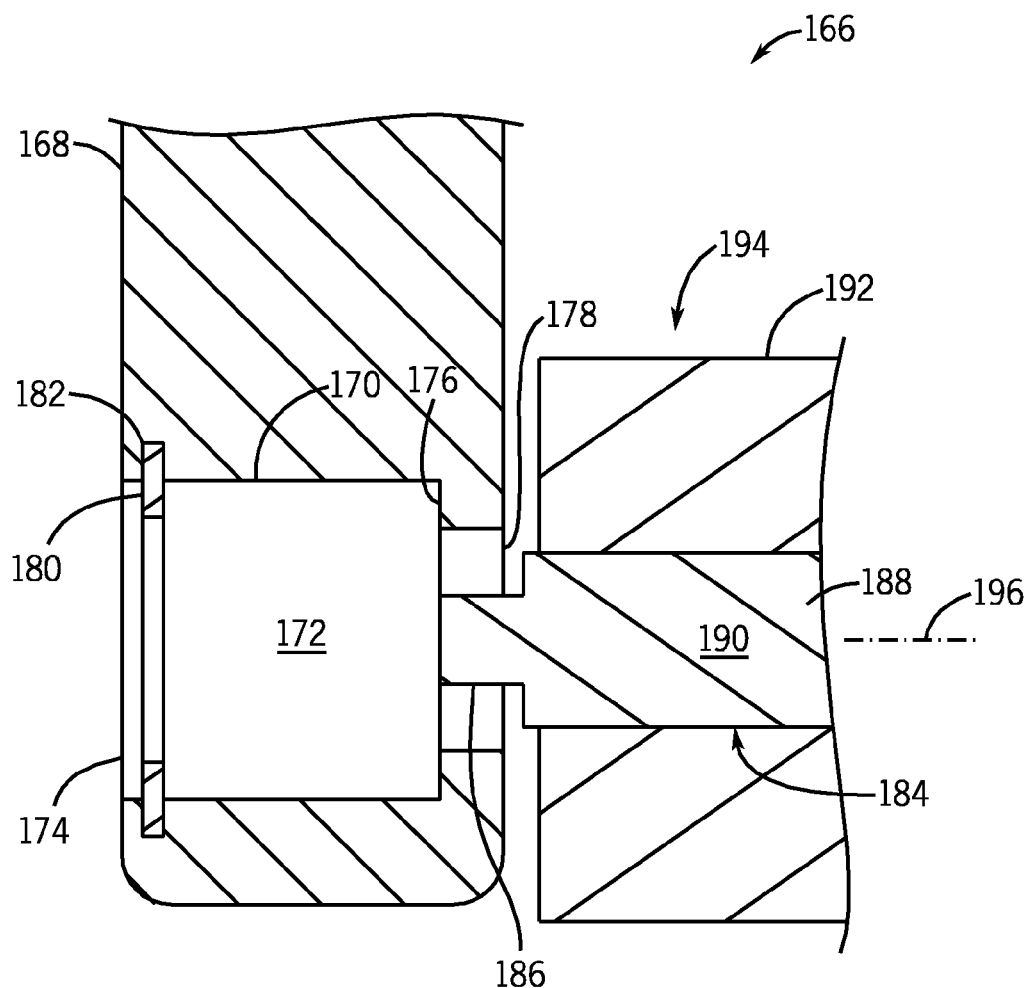
FIG. 5 is a partial section view of another example wheel support assembly.

With additional reference to FIG. 5, a fourth example wheel support assembly (166) is illustrated. Again, a vehicle mount (168) extends from, is fixed to, or is integral with the vehicle (not shown). A recess (170) is formed in the vehicle mount (168) and a bearing (172) is seated within the recess (170). The recess (170) defines an outside opening (174)

sized to allow the bearing (172) to slide into the recess (170) until the bearing (172) abuts a ledge (176) near an inside opening (178) that is smaller in diameter than the outside opening (174). A snap ring (180) is seated in a groove (182) formed adjacent the outside opening (174) of the recess (170). An axle (184) defines a first diameter portion (186) that is sized to engage the bearing (172) such that the axle (184) is rotationally coupled to the bearing (172). The axle (184) also defines a second diameter portion (188) extending away from the bearing (172), which is larger in diameter than the first diameter portion (186), and acts as a hub (190) about which a tire (192) is supported, thus defining a wheel (194).

The wheel support assembly (166), shown in FIG. 5, spaces the wheel (194) apart from the bearing (172) along a longitudinal axis (196) of the axle (184). By removing the bearing (172) from within the hub (190) and seating the bearing (172) in thermal communication with the vehicle mount (168) configured as a heat sink, heat generated as the bearing (172) rotates is not directly transferred into the hub (190). A larger portion of the heat more easily transfers to the vehicle mount (168) (as compared to the axle (184)), which preferably has a higher thermal diffusivity than the axle (184).

Figure 6:
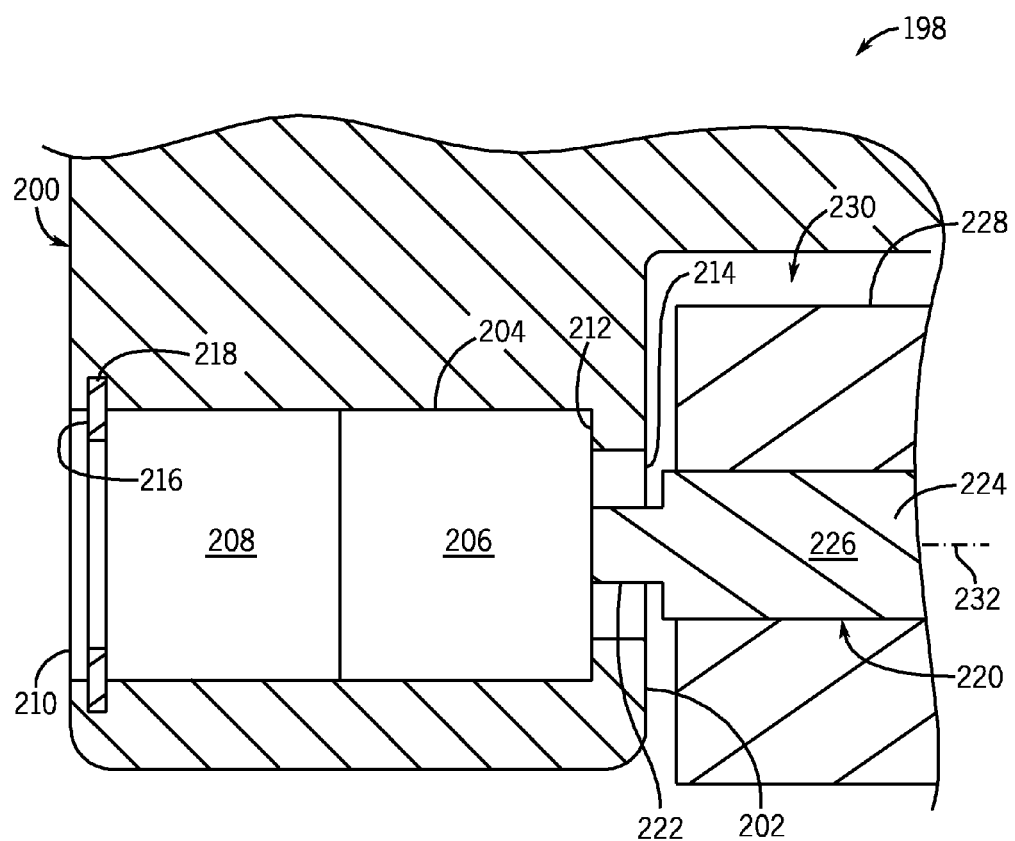
FIG. 6 is a simplified cross-section of another example wheel support assembly incorporating a pair of bearings.

Turning to FIG. 6, a fifth example wheel support assembly (198) is shown. A vehicle mount (200) is illustrated as integral with the vehicle and defines a pocket (202). A recess (204) is formed in the vehicle mount (200) adjacent the pocket (202) and two bearings (206, 208) are press-fit within the recess (204). The recess (204) defines an outside opening (210) sized to allow the bearing (206) to slide into the recess (204) until the bearing (206) abuts a ledge (212) near an inside opening (214) that is smaller in diameter than the outside opening (210). The other bearing (208) is then press-fit into the recess (204) and positioned next to the bearing (206) previously seated within the recess (204). A snap ring (216) is secured in a groove (218) formed adjacent the outside opening (210) of the recess (204).

An axle (220) defines a first diameter portion (222) that is sized to engage the bearings (206, 208) such that the axle (220) is rotationally coupled to the bearings (206, 208). The axle (220) also defines a second diameter portion (224) extending away from the bearings (206, 208), which is larger in diameter than the first diameter portion (222), and acts as a hub (226) about which a tire (228) is supported, thus defining a wheel (230). In some forms, two additional bearings (not shown) are configured to support the opposite end of the axle (220), such that a total of four bearings are used to support the wheel (230). As one skilled in the art will appreciate, any number and arrangement of bearings may be used in combination with the wheel support assembly concept.

The wheel support assembly (198), shown in FIG. 6, spaces the wheel (230) apart from both bearings (206, 208) along a longitudinal axis (232) of the axle (220). By removing the bearings (206, 208) from within the hub (226) and seating the bearings (206, 208) in thermal communication with the vehicle mount (200), which is configured as a heat sink, heat generated as the bearings (206, 208) rotate is not directly transferred into the hub (226). A larger portion of the heat more easily transfers to the vehicle mount (200) (as compared to the axle (220)), which preferably has a higher thermal diffusivity than the axle (220).

While there has been shown and described what is at present considered the preferred embodiments of the invention, it will be appreciated by those skilled in the art that, given the benefit of this disclosure, various changes and modifications can be made without departing from the scope of the invention defined by the following claims.

I claim:

1. A wheel support assembly for use with a vehicle, comprising:
   a vehicle mount coupleable to the vehicle;
   a recess formed in the vehicle mount;
   a bearing seated at least partially within the recess and in thermal communication with the vehicle mount;
   an axle engaged with the bearing and extending away from the bearing; and
   a wheel supported by the axle and spaced apart from the bearing along a longitudinal axis of the axle;
   wherein the vehicle mount is configured as a heat sink such that a larger portion of the heat generated by the bearing is transferred to the heat sink than the axle.

2. The wheel support assembly of claim 1, wherein a thermal conductivity of the heat sink is greater than a thermal conductivity of the axle.

3. The wheel support assembly of claim 1, wherein a thermal resistance between the bearing and the heat sink is less than a thermal resistance between the bearing and the axle.

4. The wheel support assembly of claim 1, wherein the bearing is completely seated within the recess.

5. The wheel support assembly of claim 1, wherein the bearing is press-fit into the recess.

6. The wheel support assembly of claim 1, wherein:
   the vehicle mount defines a groove adjacent the recess; and
   a snap ring is seated in the groove to capture the bearing in the recess.

7. The wheel support assembly of claim 1, wherein the vehicle mount includes a removable cap portion proximate a distal end of the vehicle mount that captures the bearing within the recess.

8. The wheel support assembly of claim 1, wherein:
   the vehicle mount includes a support arm;
   the support arm defines at least a first leg and a second leg connected by a bridge;
   the recess is formed in the first leg;
   a second recess is formed in the second leg;
   a second bearing is seated within the second recess and in thermal communication with the second leg;
   the axle is engaged with and extends between the bearing and the second bearing; and
   the wheel is supported by the axle between the bearing and the second bearing.

9. The wheel support assembly of claim 8, wherein:
   the wheel includes more than one wheel; and
   further comprising at least one of a wheel bearing and a wheel bushing fitted between at least one of the more than one wheel and the axle such that the at least one of the more than one wheel can rotate relative to the axle.

10. The wheel support assembly of claim 1, wherein:
    the vehicle is a material handling vehicle; and
    the wheel is at least one of a load wheel, a drive wheel, a caster wheel, and a steering wheel.

11. The wheel support assembly of claim 1, wherein the wheel includes a metallic hub rotatably fixed to the axle and a non-metallic tire secured about the metallic hub.

12. The wheel support assembly of claim 1, wherein the axle defines a circular cross-section in a plane perpendicular to the longitudinal axis of the axle.

13. The wheel support assembly of claim 1, wherein the bearing is at least one of a roller bearing and a ball bearing.

14. The wheel support assembly of claim 1, further comprising at least one of a wheel bearing and a wheel bushing fitted between the wheel and the axle such that the wheel can rotate relative to the axle.

15. A wheel support assembly for use with a vehicle, comprising:
a support arm extending from the vehicle defining a first leg and a second leg;
a first recess formed in the first leg;
a second recess formed in the second leg;
a first bearing seated at least partially within the first recess and in thermal communication with the first leg;
a second bearing seated at least partially within the second recess and in thermal communication with the second leg;
an axle engaged with the first bearing and the second bearing; and
a wheel supported by the axle between the first bearing and the second bearing;
wherein at least one of the first leg and the second leg is configured as a heat sink such that a larger portion of the heat generated by at least one of the first bearing and the second bearing is transferred to the heat sink than the axle.

16. The wheel support assembly of claim 15, wherein a thermal conductivity of the heat sink is greater than a thermal conductivity of the axle.

17. The wheel support assembly of claim 15, wherein a thermal resistance between the bearing and the heat sink is less than a thermal resistance between the bearing and the axle.

18. The wheel support assembly of claim 15, wherein:
the first bearing is completely seated within the first recess; and
the second bearing is completely seated within the second recess.

19. The wheel support assembly of claim 15, wherein:
the wheel comprises more than one wheel supported by the axle between the first bearing and the second bearing; and
wheel bushings are fitted between each wheel and the axle such that each wheel can rotate relative to the axle.

20. A wheel support assembly for use with a vehicle, comprising:
a support arm extending from the vehicle;
a recess formed in the support arm;
a first bearing seated at least partially within the recess and in thermal communication with the support arm;
a second bearing seated at least partially within the recess and in thermal communication with the support arm;
an axle engaged with the first bearing and the second bearing, and extending away from the first bearing and the second bearing; and
at least one wheel supported by the axle and spaced apart from the first bearing and the second bearing along a longitudinal axis of the axle;
wherein the support arm is configured as a heat sink such that a larger portion of the heat generated by the first bearing and the second bearing is transferred to the heat sink than the axle.

* * * * *